H. E. LOWE.
ARTIFICIAL BAIT.
APPLICATION FILED SEPT. 16, 1911.
1,009,538.                                   Patented Nov. 21, 1911.
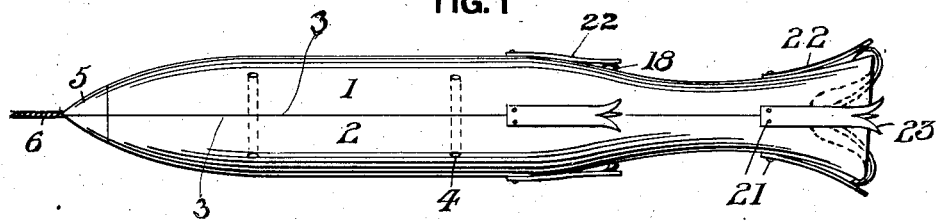
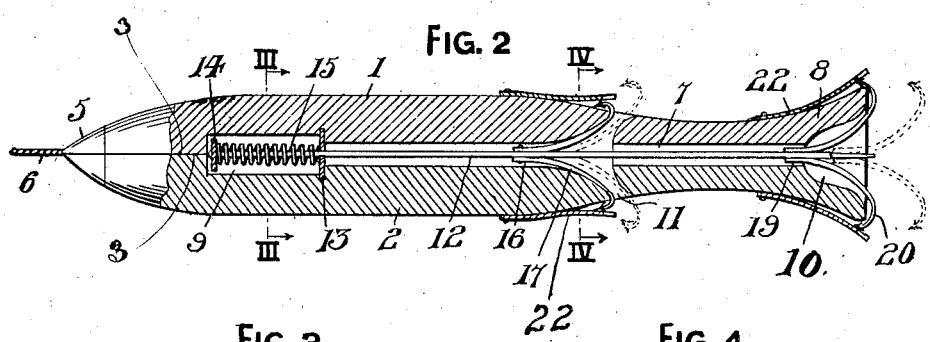
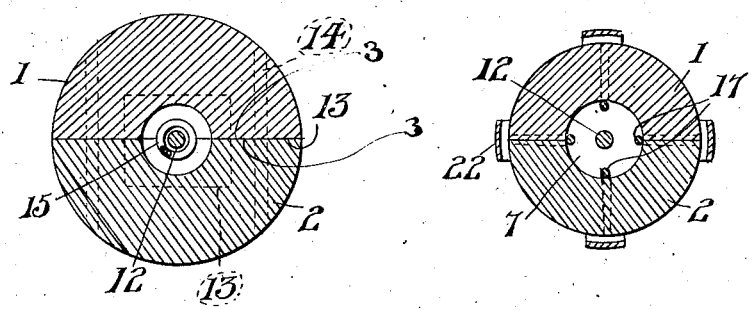
WITNESSES
INVENTOR
Harry E. Lowe
BY
ATTORNEYS

UNITED STATES PATENT OFFICE.

HARRY E. LOWE, OF PITTSBURGH, PENNSYLVANIA.

ARTIFICIAL BAIT.

1,009,538.   Specification of Letters Patent.   Patented Nov. 21, 1911.

Application filed September 16, 1911. Serial No. 649,637.

*To all whom it may concern:*

Be it known that I, HARRY E. LOWE, a citizen of the United States of America, residing at Pittsburgh, in the county of Allegheny and State of Pennsylvania, have invented certain new and useful Improvements in Artificial Bait, of which the following is a specification, reference being had therein to the accompanying drawing.

This invention relates to artificial bait for fishing outfits, and the primary object of my invention is to provide an artificial minnow that can be advantageously used in trolling streams or bodies of water containing weeds, grass, rocks and other obstructions that would interfere with the use of an ordinary type of fish hook.

Another object of this invention is to provide an artificial minnow with a series of hooks that are released by the mouth of a fish closing upon the minnow.

A further object of this invention is to furnish an artificial minnow with simple and effective means for protecting the hooks thereof from engaging in weeds and the crags of rocks.

A still further object of this invention is to provide an artificial minnow that is inexpensive to manufacture, durable and highly efficient for the purposes for which it is intended.

With the above and other objects in view, the invention resides in the novel construction, combination and arrangement of parts to be hereinafter specifically described and then claimed.

Reference will now be had to the drawing, wherein:—

Figure 1 is a side elevation of the artificial bait, Fig. 2 is a longitudinal sectional view of a portion of the same, Fig. 3 is an enlarged cross sectional view taken on the line III—III of Fig. 2, and Fig. 4 is a similar view taken on the line IV—IV of Fig. 2.

A bait in accordance with this invention comprises a body having sections 1 and 2, said sections having flat sides 3 to confront each other and the other sides of the sections 1 and 2 are shaped whereby the bait will have the appearance of a minnow or small fish. The sections 1 and 2 are connected by rivets 4 or other fastening means, and the head end of the bait has a cap or nose 5 in which is fixed the end of a line 6. This cap or nose has the outer surface thereof flush with the sections 1 and 2 and the line is held in such a manner that the bait will readily glide by and between weeds and other matter.

The sections 1 and 2 have the flat confronting faces thereof provided with longitudinal grooves forming a longitudinal bore 7 that extends from the tail 8 of the bait to a point in proximity to the head of the bait. The inner end of the bore 7 is enlarged to provide a cavity 9, and the outer end of the bore terminates in a recess 10 in the tail 8. The bore 7, intermediate the ends thereof, is in communication with radially and rearwardly extending openings 11 terminating at the outer sides of the bait.

Arranged within the bore 7 is a longitudinal rod 12 and the inner end of this rod extends through a plate 13 mounted in one end of the cavity 9. The end of the rod is attached to a head 14 and encircling said rod, between the head 14 and the plate 13, is an extensible and contractible spring 15 which is connected at one end to the head 14 and at its other end to the plate 13. When the rod 12 is in the position as shown in Fig. 2, the spring 15 is extended, so that when the rod 12 is released, the contracting of the spring 15 will force the rod 12 outwardly.

Suitably connected to the rod 12, as at 16 are the inner ends of radially disposed hooks 17, said hooks extending through the openings 11 with the pointed or barbed ends 18 thereof pointing toward the head of the bait. Suitably connected to the outer end of the rod 12, as at 19 is another series of hooks 20, these hooks extending out of the recess 10 of the tail 8.

Secured to the outer sides of the bait as at 21 are resilient guards 22, said guards having the outer ends thereof forked or bifurcated, as at 23. These resilient guards are adapted to normally bear upon the hooked or barbed ends of the hooks 17 and 20 as shown in Fig. 2 and hold the hooks in a retracted position, but immediately upon the mouth of a fish closing upon either side of the resilient guards these latter will be forced off the hooks, due to the fact that pressure upon the groove will bear the free ends thereof inwardly so that the said free ends will slide off of the barbed ends of the hooks, due to the fact that the free ends of the groove are bifurcated or have V shaped notches as clearly indicated in Fig. 1, the groove bearing upon the barbed ends of the hooks at the center of the wall of the notches.

When the central portions of the walls of the notches pass off the barbed ends of the hooks the hooks are released and the spring 15 immediately shifts the rod 12 outwardly and the hooks to a position approximately that shown by dotted lines in Fig. 2.

From the foregoing it will be observed that the hooks are guarded until the artifical bait is grabbed by a fish, and it is a well known fact that when trolling that this operation is such that the artificial bait is jerked upon by the fish, consequently the resilient guards will be actuated by the fish to release the hooks. By instantly pulling upon the line 6 when the artificial bait is grabbed, the hooks will engage in the mouth of the fish and prevent its escape. This is especially true when the fish is large enough to move the resilient guards centrally of the bait.

The artificial bait can be made of light and durable non-corrosive metal and finished to present the appearance of a minnow or other small fish.

What I claim is:—

An artifical bait comprising a sectional body, said body having radially disposed openings intermediate the ends thereof and a recess at the tail end of said body, a longitudinal spring held rod arranged centrally of said body, hooks connected to said rod and protruding from said radially disposed openings and said recess, and resilient guards carried by the outer sides of said body and holding said hooks normally retracted.

In testimony whereof I affix my signature in the presence of two witnesses.

HARRY E. LOWE.

Witnesses:
MAX H. SROLOVITZ,
CHRISTINA T. HOOD.